Patented Mar. 9, 1954

2,671,769

UNITED STATES PATENT OFFICE 2,671,769

REDUCTION OF EXTRACTION OF DIOCTYL-PHTHALATES FROM PLASTICIZED VINYL CHLORIDE POLYMER COMPOSITIONS

Elmer E. Cowell, St. Louis County, Mo., assignor to Monsanto Chemical Company, St. Louis, Mo., a corporation of Delaware No Drawing. Application January 2, 1953,
Serial No. 329,437

7 Claims. (Cl. 260—31.8)

This invention relates to the art of stabilizing plasticized vinyl chloride containing resins and more particularly pertains to a method for preventing the extraction of dioctylphthalates from vinyl chloride containing resins plasticized therewith. This invention also pertains to a vinyl chloride containing resin product prepared from a vinyl chloride polymer composition containing a dioctyl phthalate.

Vinyl chloride containing resins plasticized with dioctylphthalates have found numerous uses in the form of thin supported and unsupported films, sheets and thick molded products, however, such forms of plasticized vinyl chloride containing resins have been found to be unsatisfactory for use where they will come into contact with an oily material such as liquid and semi-solid hydrocarbons and food oils. For example, when a film, sheet or thick molded product prepared from a vinyl chloride polymer plasticized with a dioctylphthalate comes into contact with a hydrocarbon such as gasoline, kerosene, lubricating oils and greases or liquid and semi-solid hydrocarbons derived from the destructive distillation of coal or such food oils and semi-solid oily materials as butter, margarine, corn oil, cottonseed oil and the like, the dioctylphthalate is extracted or migrates from the polymer composition to the oily material. This causes the film, sheet or thick molded product to become brittle. Heretofore, to prepare vinyl chloride polymer compositions which would be useful in contact with oily materials, it was necessary to employ plasticizers which were much more expensive than the dioctylphthalates in order that the resulting plasticized composition would give satisfactory service when in contact with an oily material. A few examples of uses of plasticized vinyl chloride polymers in contact with the above oily materials include floor tiles in garages, service stations and machine shops, seat covers for chairs and automobiles, tubing, gaskets, moisture-proof covers and coats for stored equipment, floats, plungers, food packaging, films, upholstery and electrical sheets. It is important, therefore, to provide an effective manner for the use as a plasticizer for vinyl chloride polymers the low cost dioctylphthalates so that the plasticized compositions can be employed for uses involving exposure to oily materials.

It is an object of this invention to provide a dioctylphthalate plasticized vinyl chloride polymer having improved resistance to deterioration by liquid and semi-solid oily materials.

Further objects of this invention will be evident from the detailed description.

It has been discovered that vinyl chloride containing resins plasticized with from about 37.5 to 48 parts by weight of a dioctylphthalate and from 2 to 12.5 parts by weight of butyl benzyl phthalate per 100 parts by weight of the vinyl chloride polymer possess the unusual property of being able to resist the extraction of the plasticizer when the composition is in contact with liquid or semi-solid oily materials.

The use of the term "a dioctylphthalate" is intended to include di-2-ethylhexyl phthalate, di-n-octyl phthalate, di-iso-octyl phthalate among others which contain eight carbon atoms in each of the alkyl ester radicals or an average of eight carbon atoms in these ester radicals such as exist in a mixture of diheptyl phthalate and dinonyl phthalate.

The vinyl chloride polymers which can be used in accordance with this invention include polyvinyl chloride and copolymers of vinyl chloride with other unsaturated materials copolymerizable therewith such as vinyl acetate; diethyl maleate; vinylidene chloride; vinyl propionate; vinyl butyrate; vinyl benzoate; methyl acrylate; ethyl acrylate; propyl acrylate; butyl acrylate; allyl acrylate; methyl methacrylate; ethyl methacrylate; propyl methacrylate; styrene; o-chlorostyrene; p-chlorostyrene; 2,5-dichlorostyrene; p-ethylstyrene; divinyl benzene; vinyl naphthalene; α-methylstyrene; butadiene; chloroprene; acrylic acid amide; acrylic acid anilide; acrylic acid nitrile; and esters of $\alpha,\beta$- unsaturated carboxylic acids such as the methyl, ethyl, propyl, butyl, amyl, hexyl, heptyl, octyl, allyl, methallyl and phenyl esters of maleic, crotonic, itaconic and fumaric acids. The class of copolymers in which a predominant portion, i. e. more than 50% by weght of the copolymer is made from vinyl chloride together with polyvinyl chloride represents a preferred class of vinyl chloride polymers useful according to this invention.

It is to be understood that other well known additives may be included in the compositions such as heat and/or light stabilizers, resin modifiers, films, re-inforcing agents, pigments, and other coloring materials and the like.

The following examples are illustrative of the invention but are not to be considered as limitative thereof. Where parts are mentioned they are parts by weight.

EXAMPLE I

A mixture of 100 parts of polyvinyl chloride, 47.5 parts of di-2-ethylhexyl phthalate and 2.5 parts of butyl benzyl phthalate is milled on rolls maintained at 325° F. for about 10 minutes to form a homogeneous composition. The resulting composition is pressed into the form of a sheet in a suitable mold under a pressure of about 2,000 pounds per square inch at a temperature of 325° F. for about 5 minutes.

EXAMPLE II

A mixture of 100 parts of polyvinyl chloride, 45 parts of di-2-ethylhexyl phthalate and 5 parts of butyl benzyl phthalate were milled together and pressed into a sheet in the manner described in Example I.

EXAMPLE III

A mixture of 100 parts of polyvinyl chloride, 40 parts of di-2-ethylhexyl phthalate and 5 parts of butyl benzyl phthalate were milled together and pressed into a sheet in the manner described in Example I.

A weighed portion of each of the above described sheets together with a control were subjected to a kerosene extraction test. The control was prepared by milling together 100 parts of polyvinyl chloride and 50 parts of di-2-ethylhexyl phthalate and pressing the resulting composition as described in Example I. The four sample portions of polyvinyl chloride sheet were first heated in an oven to remove moisture and then were immersed in kerosene maintained at 70° F. After 96 hours of immersion in kerosene, the portions of the sheets were withdrawn, wiped free of kerosene and dried at 80° C. for 24 hours. The dried samples were weighed and the amount of plasticizer removed by the kerosene was determined. It was noted that the control sample had shrunk during drying after the kerosene immersion. This sample was also hard and brittle whereas the other samples prepared according to this invention were soft and flexible. The shrinking of the control sample together with the resulting hardness and brittleness clearly indicated that a great amount of plasticizer had been extracted by the kerosene. Quantitative results of this kerosene extraction test are shown below in the table.

*Table*
KEROSENE EXTRACTION TEST

| Sample | Composition, Parts by Weight | | | Plasticizer, Parts | Extracted, Percent |
|---|---|---|---|---|---|
| | PVC | DOP¹ | BBP² | | |
| Control | 100 | 50 | 0 | 18.3 | 36.6 |
| Example I | 100 | 47.5 | 2.5 | 5.85 | 11.7 |
| Example II | 100 | 45.0 | 5.0 | 2.60 | 5.2 |
| Example III | 100 | 40.0 | 10.0 | 1.55 | 3.1 |

¹ Di-2-ethylhexyl phthalate.
² Butyl benzyl phthalate.

EXAMPLE IV

Example I is repeated except that the polyvinyl chloride is replaced by a copolymer of 90 parts vinyl chloride and 10 parts diethyl maleate. It is found that the inclusion of butyl benzyl phthalate is also effective in improving the resistance of this plasticized polymer to oily materials.

EXAMPLE V

Example I is repeated except that the polyvinyl chloride is replaced by a copolymer of 90 parts vinyl chloride and 10 parts vinyl acetate. It is found that the inclusion of butyl benzyl phthalate is also effective in improving the resistance of this plasticized polymer to oily materials.

EXAMPLE VI

Example I is repeated except that polyvinyl chloride is replaced by a copolymer of 95 parts of vinyl chloride and 5 parts of vinylidene chloride. It is found that the inclusion of butyl benzyl phthalate is also effective in improving the resistance of this plasticized polymer to oily materials.

What is claimed is:

1. A composition comprising a vinyl chloride polymer from 37.5 to 48 parts by weight of a dioctyl phthalate and from 2 to 12.5 parts by weight of butyl benzyl phthalate per 100 parts by weight of the vinyl chloride polymer.

2. A composition comprising polyvinyl chloride, from 37.5 to 48 parts by weight of a dioctyl phthalate and from 2 to 12.5 parts by weight of butyl benzyl phthalate per 100 parts by weight of polyvinyl chloride.

3. A composition comprising a copolymer of vinyl chloride and vinyl acetate from 37.5 to 48 parts by weight of a dioctyl phthalate and from 2 to 12.5 parts by weight of butyl benzyl phthalate per 100 parts by weight of the vinyl chloride vinyl acetate copolymer.

4. A composition comprising a copolymer of vinyl chloride and diethyl maleate from 37.5 to 48 parts by weight of a dioctyl phthalate and from 2 to 12.5 parts by weight of butyl benzyl phthalate per 100 parts by weight of the vinyl chloride diethyl maleate copolymer.

5. A composition comprising a copolymer of vinyl chloride and vinylidene chloride from 37.5 to 48 parts by weight of a dioctyl phthlate and from 2 to 12.5 parts by weight of butyl benzyl phthalate per 100 parts by weight of the vinyl chloride vinylidene chloride copolymer.

6. A composition comprising polyvinyl chloride, 37.5 to 48 parts by weight of di-2-ethylhexyl phthalate, and 2 to 12.5 parts by weight of butyl benzyl phthalate per 100 parts by weight of polyvinyl chloride.

7. A composition comprising polyvinyl chloride, 47.5 parts by weight of di-2-ethylhexyl phthalate, and 2.5 parts by weight of butyl benzyl phthalate per 100 parts by weight of polyvinyl chloride.

ELMER E. COWELL.

References Cited in the file of this patent

UNITED STATES PATENTS

| Number | Name | Date |
|---|---|---|
| 2,542,179 | Buchanan | Feb. 20, 1951 |